United States Patent
Bahl et al.

(10) Patent No.: US 8,079,074 B2
(45) Date of Patent: Dec. 13, 2011

(54) DYNAMIC SECURITY SHIELDING THROUGH A NETWORK RESOURCE

(75) Inventors: Pradeep Bahl, Redmond, WA (US); Rajesh K. Dadhia, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1215 days.

(21) Appl. No.: 11/787,589

(22) Filed: Apr. 17, 2007

(65) Prior Publication Data

US 2008/0263654 A1   Oct. 23, 2008

(51) Int. Cl.
*G06F 21/00* (2006.01)
*H04L 29/06* (2006.01)

(52) U.S. Cl. .................................. 726/11; 726/25

(58) Field of Classification Search .................. None
See application file for complete search history.

(56) References Cited

U.S. PATENT DOCUMENTS

| | | | |
|---|---|---|---|
| 6,061,798 A | 5/2000 | Coley et al. | |
| 7,143,188 B2 | 11/2006 | Maufer et al. | |
| 7,302,706 B1 * | 11/2007 | Hicks et al. | 726/24 |
| 7,346,922 B2 * | 3/2008 | Miliefsky | 726/3 |
| 2002/0078382 A1 | 6/2002 | Sheikh et al. | |
| 2003/0040968 A1 | 2/2003 | Li et al. | |
| 2003/0046583 A1 | 3/2003 | Goldman et al. | |
| 2003/0208596 A1 | 11/2003 | Carolan et al. | |
| 2006/0064754 A1 | 3/2006 | Frank et al. | |
| 2006/0123481 A1 | 6/2006 | Bhatnagar et al. | |
| 2006/0137003 A1 | 6/2006 | Glania | |
| 2006/0236392 A1 | 10/2006 | Thomas et al. | |
| 2006/0259967 A1 | 11/2006 | Thomas et al. | |
| 2006/0265741 A1 | 11/2006 | Yeom | |
| 2007/0039053 A1 * | 2/2007 | Dvir | 726/24 |
| 2009/0320135 A1 * | 12/2009 | Cavanaugh | 726/24 |

OTHER PUBLICATIONS

"Layered Defense approach to network security", http://www.nortel.com/solutions/security/collateral/nn108120-051705.pdf.
Tan, EE Sze, "Sentivist to get dynamic shielding capabilities", Date: 2005, http://www.computerworld.com.au/index.php/id;1021053783.

* cited by examiner

*Primary Examiner* — Gilberto Barron, Jr.
*Assistant Examiner* — Simon Kanaan

(57) ABSTRACT

Architecture for facilitating access of remote system software functionality by a host machine for the redirection of incoming and/or outgoing host traffic through the remote system for protection services to the host machine. The host machine can gain the benefits of effective protection software such as firewall, intrusion protection software, and anti-malware services, of the remote machine. The host machine can choose to exercise traffic redirection when there is a risk of being compromised, and then revert back to direct communications when the risk has been averted. The host machine takes advantage of the resources available on the remote machine in substantially realtime with minimal disruption to the host and/or the remote machine operations. This facilitates widespread and temporary protection of network systems for a more secure working environment and improved customer experience.

20 Claims, 15 Drawing Sheets

DYNAMIC SECURITY SHIELDING THROUGH A NETWORK RESOURCE

BACKGROUND

Software is an essential component for the operation of most systems. For example, software runs as an essential part on a variety of computing devices such as handle-held music players, digital assistants, smartphones, laptops, desktops, and data center machines. Moreover, it is becoming commonplace for users to have more than one device that uses software as a central component. Home networks that accommodate wired and wireless computing as well as phone systems are increasing in number as technological advances continue to drive down costs.

However, not all these devices and gadgets will come equipped with the requisite software or the hardware resources (e.g., CPU power or memory capacity) to be able to run the latest software (e.g., security). Provisioning machines with the latest updates as soon as they become available, especially with respect to malware protection, can become a problem in a corporate enterprise as users travel, machines get used offline at times when updates are being distributed, and users simply fail to maintain the systems by postponing the update.

Whether a machine is on an enterprise network, on a relatively less secure network (e.g., a home network, or the Internet), there will be situations where a user system needs more security software than is currently installed or the system could possibly host in order to stay protected from potential attacks. There are also situations where a system, despite having all the right and latest security software installed or having the latest updates to fix vulnerabilities, needs a central (or remote) device for filtering the incoming traffic to provide protection from DOS (denial-of-service) attacks that consume excessive network bandwidth and processor cycles.

Consider a fixed security infrastructure where a network worm is circulating that exploits a vulnerability in HTTP (hypertext transfer protocol). A known signature is available; however, there are two devices, one for which there is no available intrusion protection software (IPS), and another, which due to limited CPU power and memory capacity, is not running the available IPS software. In another example, consider a roaming scenario where a group of users roam through hot spots. The blend of computing devices is such that some of these devices lack the requisite security software for adequate protection. In at least these situations a mechanism should be made available by which the devices can quickly garner external resources available on the network to dynamically mount effective protective shields.

SUMMARY

The following presents a simplified summary in order to provide a basic understanding of novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides a mechanism by which a host machine can direct incoming and/or outgoing traffic through a proxy machine (e.g., a server) that provides one or more effective shields such as a firewall, intrusion protection software (IPS), and anti-malware services, to the host machine. The host machine can choose to exercise redirection when there is a risk of being compromised, and then revert back to direct communications when the risk has been averted. Redirection can occur dynamically. Redirection can be done as per a command and/or policy and for as long as needed or specified.

The architecture includes a mechanism for changing direct communications of host machine traffic into indirect communications through the proxy that has the requisite security shields (or other types of software that satisfy a client's need), and then reverting away from the proxy back to direct communications automatically, as and when needed. The host machine can take advantage of the resources available on the proxy machine in substantially realtime with minimal disruption to the host and/or the proxy machine operations. This facilitates widespread and temporary protection of network systems resulting in a more secure working environment and improved customer experience.

The architecture works in a fixed infrastructure (e.g., an enterprise) and in ad-hoc networks, for example. Additionally, a mechanism is disclosed for discovering and electing a proxy system to mount effective security shields for the client machine in the absence of managed fixed infrastructure security devices.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
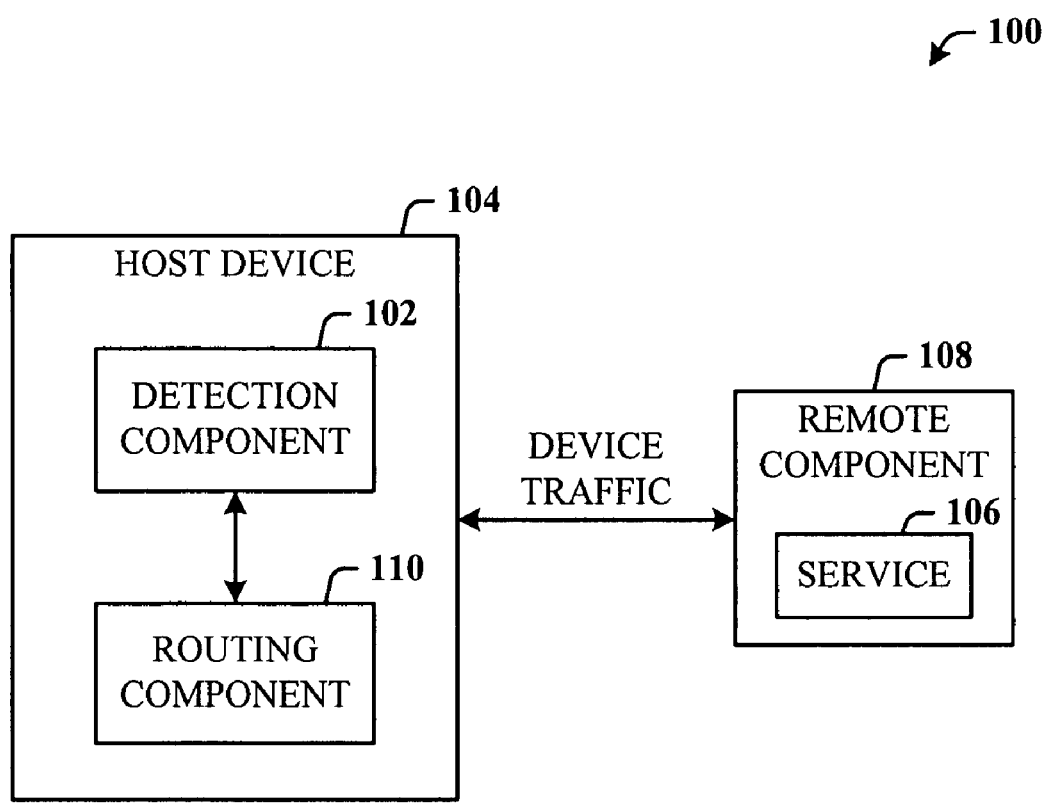
FIG. 1 illustrates a computer-implemented services system for remote services protection.

The architecture described herein is a mechanism for allowing a client machine or device to access functionality (e.g., security) provided by software on a remote machine (e.g., an elected machine) and providing that functionality to the client on a temporary basis. In a specific example, a client with limited or no malware protection software capability can access a remote system, and leverage the remote system's malware protection software to provide the system with the necessary protection.

Consider two devices where a first device has no available intrusion protection software (IPS) and the second, due to limited CPU processing power and memory capacity, is not running the latest available IPS software. If a proxy server that is running the IPS with the latest signature set is present, the devices can route all traffic through the proxy server thus acquiring a means for protection until the devices receive and install necessary patches or the IPS software along with the latest signature set or get protected through some other means such as being connected only to secure networks where the extra protection through a central device is not necessary. Once the devices get patched, install the needed IPS, or determine that the protection provided by the proxy server is no longer needed, the devices can disconnect from the proxy and route traffic directly, thereby operating independently of the proxy server.

In a roaming example where a group of users roam hotspots, the blend of computing devices is such that one or more of these devices can lack the requisite security software for adequate protection. In response, the devices that lack the software discover and elect one of the machines in the group that has the requisite security software to provide the protection as a proxy server and start routing traffic through it.

Note that although the description focuses on security or protection software as a need by an inadequately-protected client, the type of software service can be related to other needs such as simply offloading processing to an elected peer client that has the software and/or hardware capability to handle the processing, for example.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates a computer-implemented services system 100 for remote services protection. The system 100 can include a detection component 102 of a host device 104 for detecting a need for a service 106 of a remote component 108. A routing component 110 can be provided as part of the host device 104 for dynamically routing host traffic to a remote component 108 to obtain the service 106 based on the need or policy (e.g., host). The dynamic characteristics of the system 100 facilitate not only dynamic routing, but other processes associated with detecting; for example, selecting the remote component 108 to provide the service 106, and redirecting the host device traffic back to the host device for local processing when desired.

The system 100 provides a mechanism by which the host device 104 (or machine) can direct incoming and/or outgoing traffic through the remote component 108 (e.g., a proxy server) that provides one or more needed services. The services can include "shielding" software that provides to the device traffic of the host device 104 functionality related to firewall protection, intrusion protection (e.g., via intrusion protection software (IPS)), and anti-malware services. The host device 104 can choose to exercise redirection of the host device traffic from a direct communications mode with a network or other device to an indirect communications mode through another device or server via the routing component 110, when there is a risk of being compromised, for example. When the threat or risk is reduced or eliminated and/or the host device software has been upgraded or new software installed, then the host device traffic can be routed back to the host device 104 for direct communications with a network or other devices. Redirection, as well as other associated component processes, can occur dynamically as a result of a command and/or policy.

One practical example includes a security administrator of a corporate enterprise network learning of a new vulnerability in one or more client operation systems (OS's) in widespread use, such as for desktop computers, portable computers PDAs, etc. It is commonplace for business intranets, hotspots in the public domain, or even home networks to include machines running various OS versions and different versions of application (e.g., security) software. Accordingly, there is an ongoing need to maintain the highest level of protection which can be by simply receiving the latest updates. However, it is conceivable that there are users or customers, for example, which lack the requisite software entirely.

Continuing with the corporate example, when a security administrator received notice of an OS (or program) vulnerability, the administrator can issue a network risk beacon that notifies the machines about the vulnerability. The beacon can serve as a triggering event that prods or commands the vulnerable machines to direct all further communications through a network proxy that has the necessary shields to protect the machines against the exploit, until such time as the machines can receive the protection software needed. It is also within contemplation of the disclosed architecture that the vulnerable machines do not need to update or receive the vulnerability updates at all, but can simply use the proxy when needed. This can be the situation where hotspot are involved such that customers temporarily use the vendor network, and then disconnect.

Another practical application includes gadgets or subsystems such as associated with smart devices for home appliances that are essentially single-purpose devices. For example, there many appliances that rely on software for operation. Moreover, there are many appliances now being designed with networking capabilities for not only home networks, but for accessing public networks and communicating information there between. Thus, attacks can become a problem where hackers attempt to gain unauthorized access and control for otherwise dubious purposes. Hence, the devices can select and elect a home smart device to filter and protect the other devices where a vulnerability has been detected in software or one of the smart devices has been signaled about the vulnerability.

A security administrator can prefer this security mechanism to having the machines download the latest IPS software and signatures. This can be because not all devices have software downloads that can provide the protection or software protection has never been designed for the device. Additionally, there can be devices that do not have the IPS software installed and need immediate protection in that it takes too long and is too disruptive to install the requisite software given the critical operations currently underway.

Figure 2:
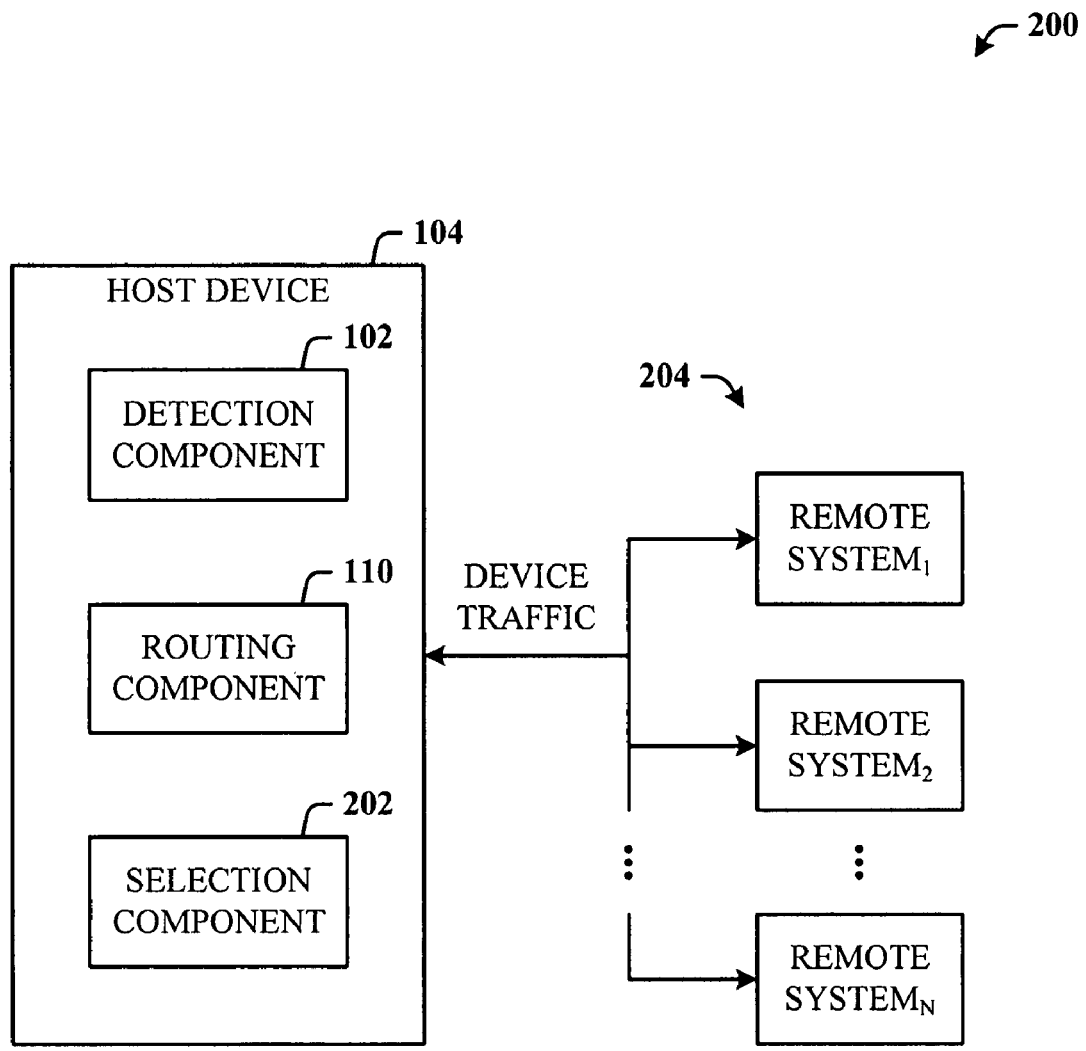
FIG. 2 illustrates a computer-implemented system for remote protection services access that further employs a selection component for selecting one or more remote systems for access.

FIG. 2 illustrates a computer-implemented system 200 for remote protection services access that further employs a selection component 200 for selecting one or more remote systems 204 (denoted REMOTE SYSTEM$_1$, . . . , REMOTE SYSTEM$_N$, where N is a positive integer) for access. The system 200 can include the host device 104, which not only includes the detection component 102 and routing component 110 for detecting a need for a service and routing host device traffic, but can also include the selection component for accessing and selecting one of a plurality of remote systems 204 for service utilization.

The selection process can be performed in several different ways. For example, on receiving a signal or instructions to initiate protection through a network proxy, for example, the proxy address(es) (where more than one proxy is utilized) can be passed with the instructions, or the machines can be pre-configured with addresses as part of IP configuration.

Other examples include assessing each of the remote systems 204 prior to host (or client) device connection based on one or more criteria. For example, hardware capabilities of the remote systems 204 can be a factor for consideration. It can be desirable to choose a remote system that has greater processing capability (e.g., two processors or multi-core or faster CPU), a faster network connection, geographically closer, and has the desired service. Selection can further be based on the remote system owner (or logged-in user), the type of service protection needed (e.g., malware, firewall, anti-virus, etc.).

Where the remote systems 204 are peer devices, the selection component 202 can also facilitate automatic and/or manual election of one of the other peer devices to become the server, and handle the routed host device(s) traffic. Although only one host device 104 is shown, it is further to be understood that there are multiple hosted devices that could be required to connect and receive the protection or service.

In preparation for such an instance, each device 104 can include, as part of the selection component 202, a subsystem (not shown) that processes and generates a value or data that is a general measure of the capabilities offered and available by that device. Thus, during the selection (and election) process, the networked machines can quickly process the values or data of the devices and select the most capable (or most suitable) device to act as the server in that particular instance. For example, it can be that a device has the service(s) needed for the particular instance, but not in a later scenario.

In yet another novel embodiment, the selection component 202 can include risk-management analysis, where scores are generated and associated with types of events. For example, one score can be available for a client/proxy server scenario, while another score can be generated and associated with a peer-to-peer (P2P) environment. Accordingly, other pulse points can also be monitored and all pulse points processed to generate a risk score for the machine. A lower risk score can be interpreted to be more secure (or having a lower relative risk) than a machine advertising a higher value. If the risk is high, another machine can be selected to serve as the proxy server.

In another embodiment, a remote system can advertise its capabilities. For instance, the host device may not want to proxy the firewall capabilities because the remote system has the appropriate firewall policy. However, the host only wants to use the IPS and antivirus components. It specifies that to the proxy. Moreover, there can be machines that advertise as being collaborative for providing partial protection and those which are not. When multiple devices are available for selection, the host can negotiate with the devices and then choose one that best fits its needs. This negotiation and selection can be performed at anytime with a previous selection giving way to a new one at a later time. One situation in which this could happen is if the previous proxy gets overloaded or can no longer be reached.

Figure 3:
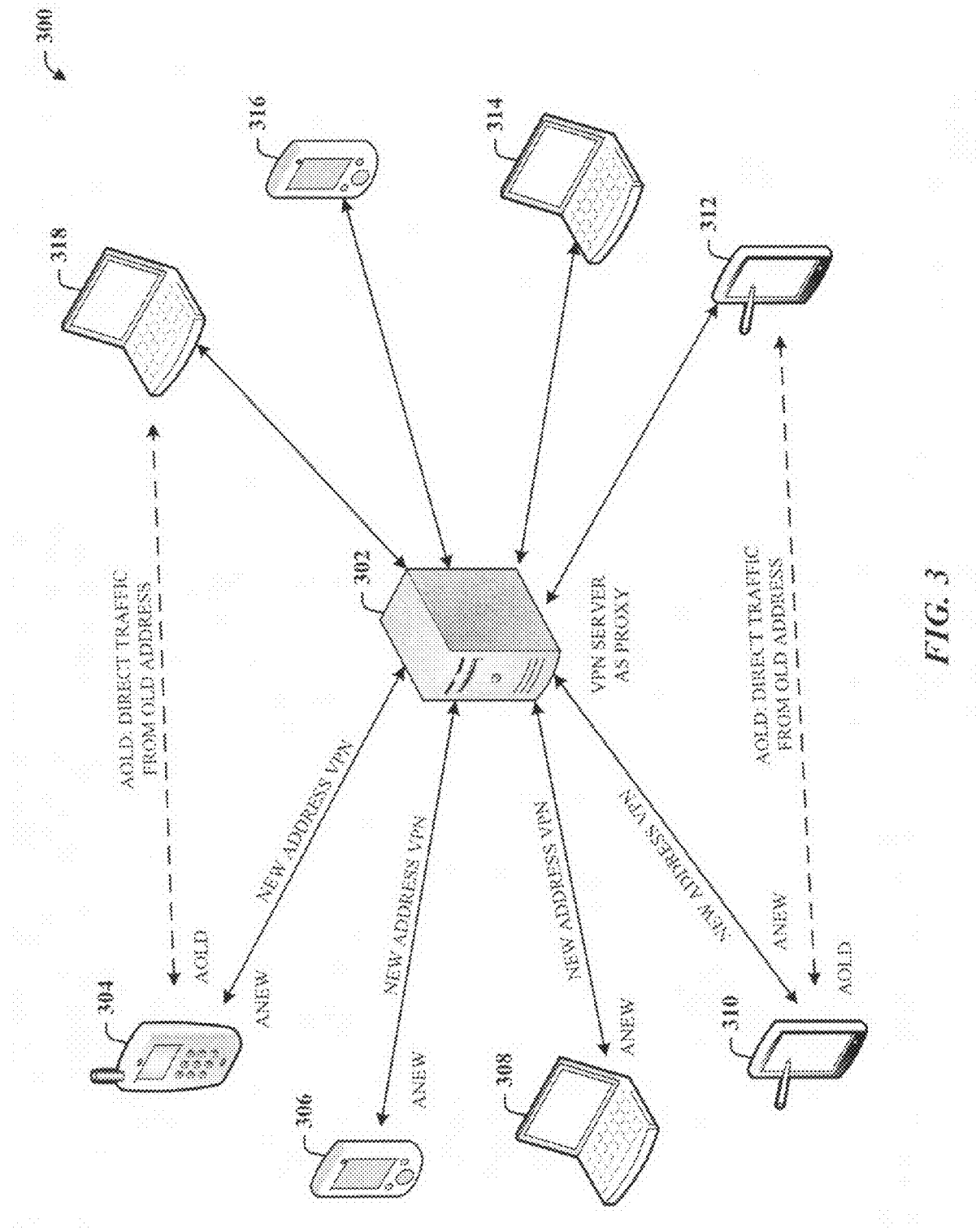
FIG. 3 illustrates an exemplary system that utilizes a virtual private network (VPN) for traffic routing to a desired proxy service.

FIG. 3 illustrates an exemplary system 300 that utilizes a virtual private network (VPN) for traffic routing to a desired proxy service. The system 300 includes a VPN server 302 for providing one or more services that can be lacking on one or more devices and/or computing systems. Here, multiple devices will connect or have already been connected to the server 302. The devices include a smartphone 302, a first player device 304, a first laptop 306, a first PDA 308, a second PDA 310, a second laptop 312, a second player device 314, and a third laptop 316.

Initially, the second PDA 310, second and third laptops (312 and 316) and second device player 314 were connected to the server 302. The first smartphone 302 was previously in direct communications with the third laptop 316. Similarly, the first PDA 308 was in direct communications with the second PDA 310. The direct communication pathways were established using corresponding old addresses (denoted AOLD) for direct traffic. Subsequently, selected devices (304, 306, 308 and 310) were determined to need the protection services of the server 302. Devices 312, 314, 316 and 318 are at a level that does not require server protection.

On receiving instructions to seek protection (or other services) through the proxy system 302, each device (304, 306, 308 and 310) can perform the following: form a VPN to the network proxy, deprecate all old non-VPN IP addresses on the local network interfaces, deregister old non-VPN addresses with DNS, and delete all old non-VPN inactive addresses (optional) when inactive.

More specifically, a device (or machine) forms a VPN to the proxy. This causes the machine VPN address to register in a domain name server (DNS). All connections formed thereafter (e.g., over the VPN) are tagged as VPN-hosted connections. Thus, the connections can be discovered and deprecated easily when the machine reverts back to direct communications. Additionally, a count can be maintained of the total number of such VPN-hosted connections so that the VPN connection can be terminated (when the connection count decreases to zero) after the machine has reverted back to direct communication.

With respect to the deprecation of old non-VPN IP addresses on the local network interfaces, the machine marks non-VPN addresses on the local interfaces (e.g., addresses that were in use prior to the VPN being formed), as deprecated. This prevents new connections from being accepted or initiated on/from such addresses. Another way to prevent new connections from being formed from/to the deprecated addresses is to have the firewall block the new connections. Only one non-VPN address, the one used to form the VPN earlier, is not deprecated completely in that it is allowed to be used for reinitiating the VPN connection if the existing VPN connection disconnects while the machine is directing traffic through the proxy.

In this implementation, a DHCP (dynamic host configuration protocol) server supports a deprecate mode. The deprecate mode can be entered when a client machine sends a "DHCP Deprecate" packet to the DHCP sever. During the time the address is in deprecate mode, DHCP server does not give that particular address to any other machine. The DHCP server releases a deprecated address into a free pool of addresses for assignment to another machine when the address expires or when the client machine to which the address is assigned sends a "DHCP Release" packet for that address to the DHCP server.

The client machine deregisters its non-VPN addresses with DNS, which can be part of deprecating the address. This prevents any new connections from being initiated to the non-VPN addresses. Existing connections to a non-VPN address terminate after the address is removed from the cache maintained by the end stations that formed the connections, or not discoverable from DNS by the client machines because of its expiration from the cache of the DNS server associated with the end stations.

The client machines can choose to delete non-VPN addresses, except the one used to form the VPN connection, from the local interfaces when there are no connections active on those addresses. This can be performed by releasing the addresses through "DHCP Release" messages, for example. Alternatively, the client machines can keep these addresses until the addresses expire. Again, the address used to form the VPN connection is kept active through re-registration with DHCP if needed. In case the machine was configured with static addresses, the addresses are not deleted.

Figure 4:
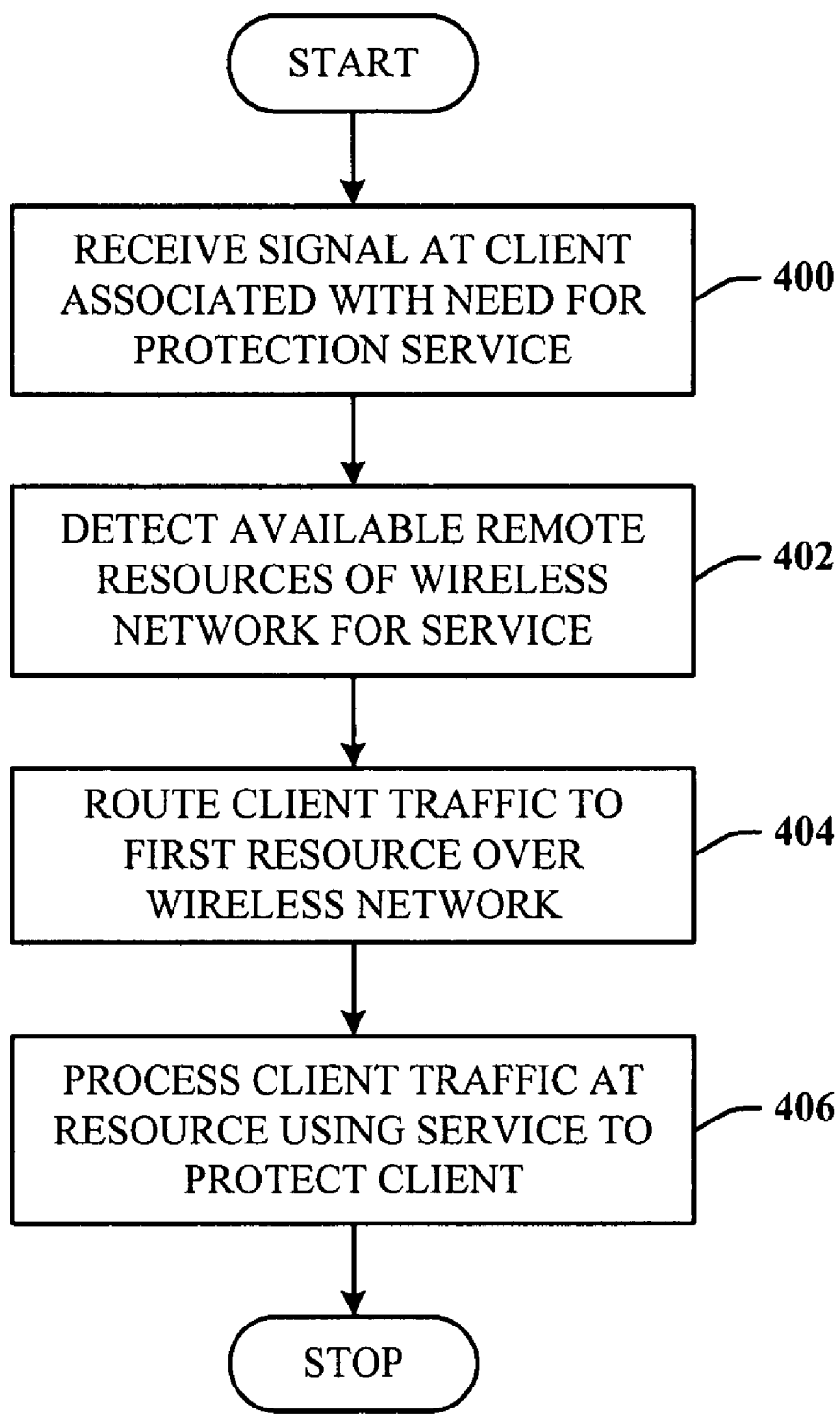
FIG. 4 illustrates a method of providing service in accordance with a novel embodiment.

FIG. 4 illustrates a method of providing service in accordance with a novel embodiment. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

At 400, a client receives a signal associated with a need for a protection service. At 402, the client detects available remote resources of a wireless network for the service. At 404, client traffic is then routed to the selected remote resource over the wireless network. At 406, the client traffic is processed by the remote resource to protect the client.

Figure 5:
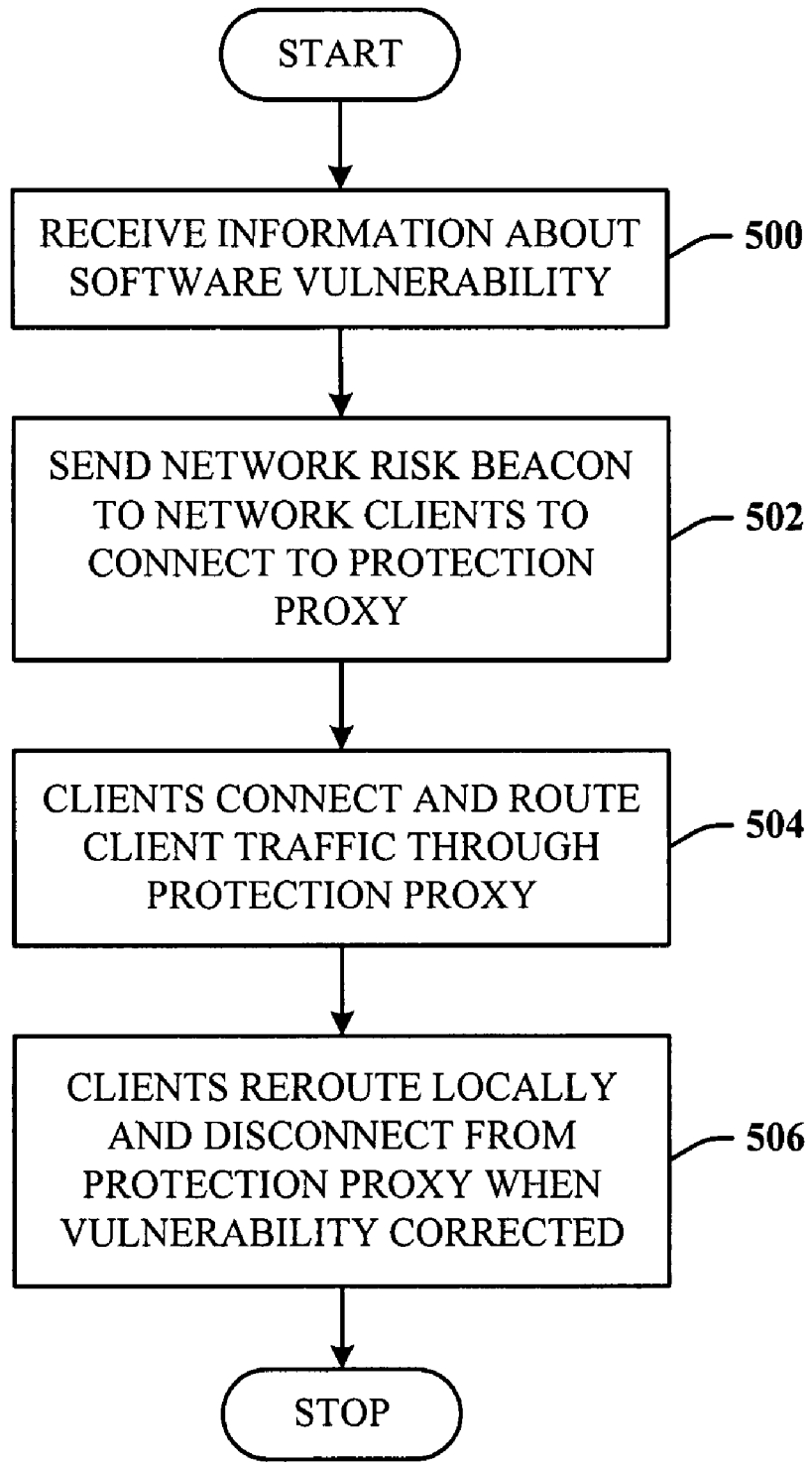
FIG. 5 illustrates a method of utilizing services of a remote source based on administrative communication of a risk beacon.

FIG. 5 illustrates a method of utilizing services of a remote source based on administrative communication of a risk beacon. At 500, information is received by an administrator and/or administrator system about a software vulnerability. In other words, the information can be received and handled manually by the administrator, or received into a system that automatically receives and processes the information to then automatically generate and transmit the risk beacon according to network policies. In a more robust implementation, the automated system can search a database of corporate devices and associated device data, select the devices that need the protection, and then send the beacon only to those devices. Moreover, this process can occur dynamically as a background process that is transparent to the user. At 502, the risk beacon is sent to network clients to connect to the protection proxy. At 504, the client can connect and then route client traffic through the protection proxy. At 506, once the risk has passed, the clients can then reroute client traffic locally, and then disconnects from the proxy server.

Figure 6:
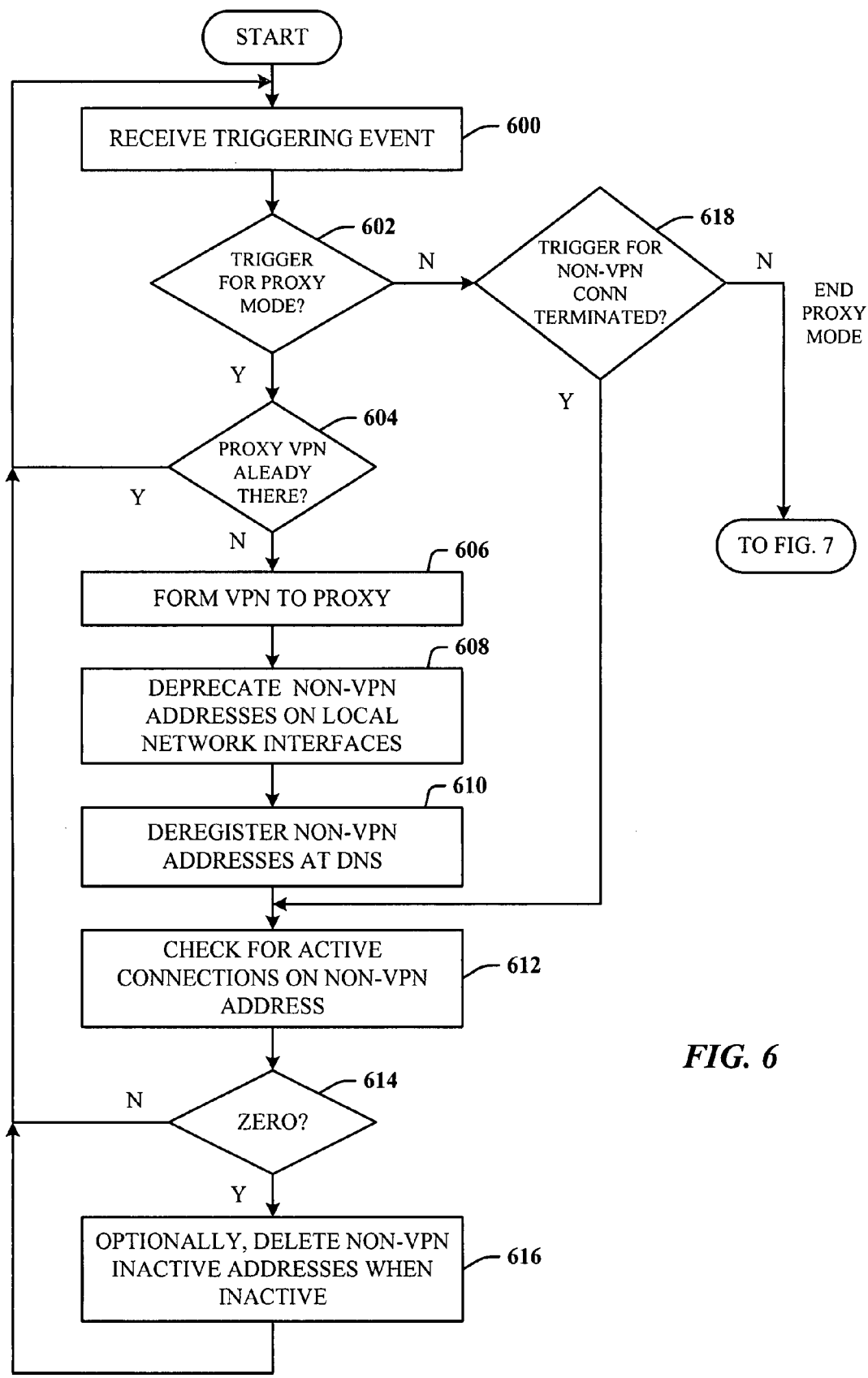
FIG. 6 illustrates an alternative and more detailed method of redirecting client traffic through a proxy protection service.

FIG. 6 illustrates an alternative and more detailed method of redirecting client traffic through a proxy protection service. At 600, a host machine receives a triggering event (e.g., a risk beacon, admin input). At 602, the system processes the event to determine if proxy mode is to be entered. If yes, flow is to 604 where the system checks to determine if a proxy VPN is already in place, and if so, flow is from 604 back to 600. In other words, the client does not need to form the VPN since the client already has a VPN through a server (the client is currently routing traffic through the server). If the proxy VPN is to be formed, flow is from 604 to 606 where a VPN is formed to the proxy. At 608, non-VPN addresses on the local network interfaces are deprecated. At 610, the non-VPN addresses, except the one over which VPN is active, are deregistered at the DNS. At 612, the system checks for active connections on non-VPN addresses. At 614, if the active connections are zero, flow is to 616 where optionally, the system deletes the non-VPN inactive addresses, when inactive. Flow is then back to 600 to monitor for the next triggering event. If, however, at 614, the active connection count is not zero, flow is from 614 back to 600 to monitor for the next triggering event.

If at 600 the triggering event, as checked at 602, is not for entering proxy mode, flow is from 602 to 618 to check if the event indicates that another connection on a non-VPN address has terminated, in which case flow is to 612. This check for termination of the non-VPN address is made only if the client is in proxy mode. If the triggering event is not for termination of connection on a non-VPN address but instead indicates that the proxy mode is to be discontinued, flow is from 618 to the flow diagram of FIG. 7 to revert back to non-VPN addresses for direct communications.

Figure 7:
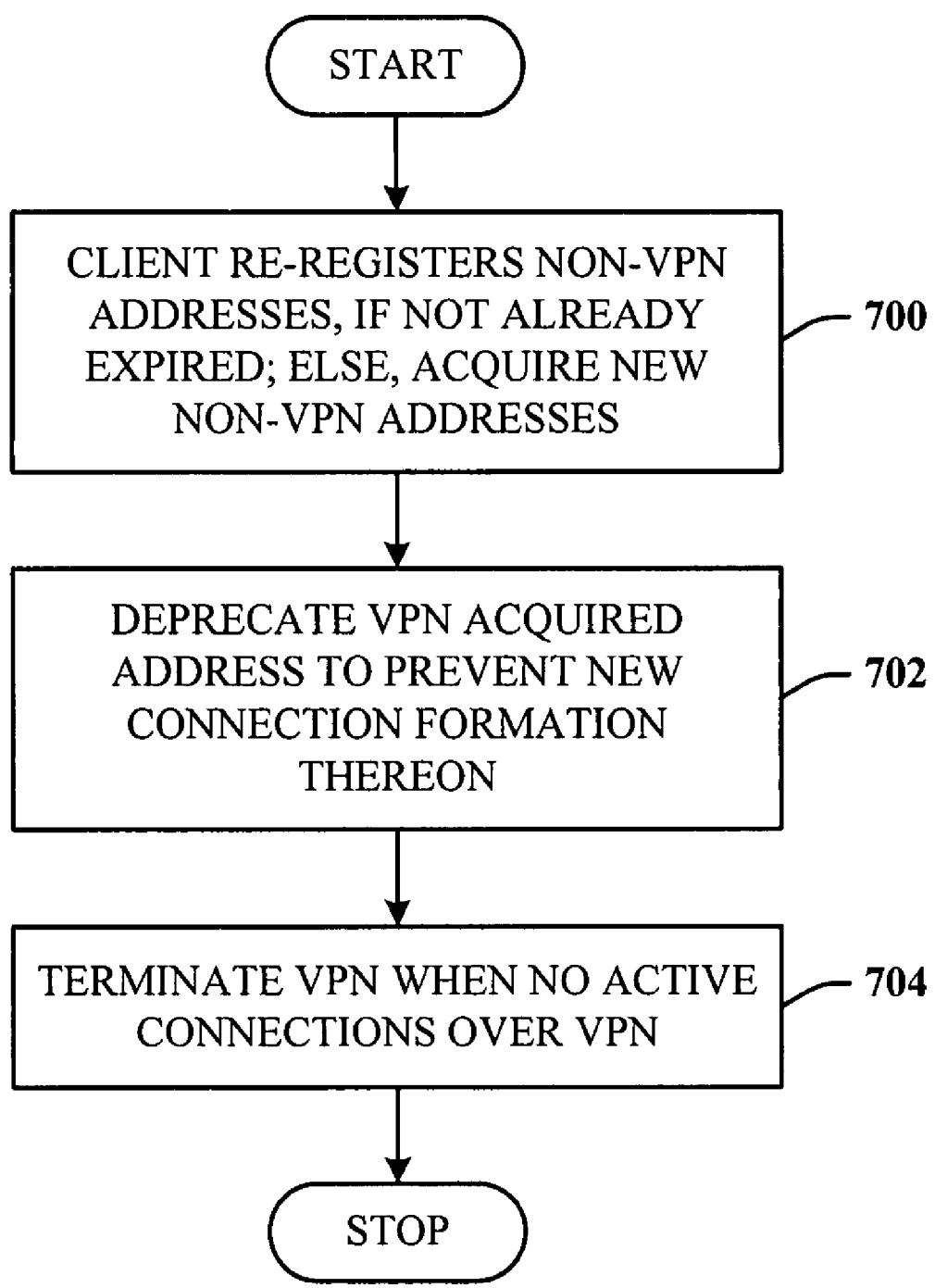
FIG. 7 illustrates a method of reverting to a direct communications mode after a need for the remote service protection has terminated.

Over time, the machines that redirected traffic to/from the network proxy, no longer need the remote service. In other words, the machines receive the needed patches or have the correct IPS software installed, or the risk has been alleviated due to some other means, and the machines revert to direct communications. FIG. 7 illustrates a method of reverting to a direct communications mode after a need for the remote service protection has terminated. At 700, the client re-registers non-VPN addresses, if not expired, or, acquires new non-VPN addresses if the non-VPN addresses have expired. More specifically, the client machines re-register non-expired non-VPN addresses in the DNS, if the addresses had not been deleted in the "redirect to proxy" mode.

The above can be accomplished, for the case where the addresses were acquired from DHCP, by renewing the non-expired addresses with the DHCP server, if the addresses were obtained earlier from the DHCP server. If the addresses had been previously deleted, or had expired, the client machine can obtain new addresses from the DHCP server. This process of renewing or acquiring addresses results in the addresses getting registered with DNS. At 702, the VPN-acquired address is deprecated so that no new connection gets formed on the VPN. The VPN-acquired address is deprecated, though the VPN itself is not terminated. No new traffic is accepted over the VPN. At 704, the VPN is terminated when there are no connections active over the VPN. This results in the VPN-acquired address of the host getting deleted from DNS.

Figure 8:
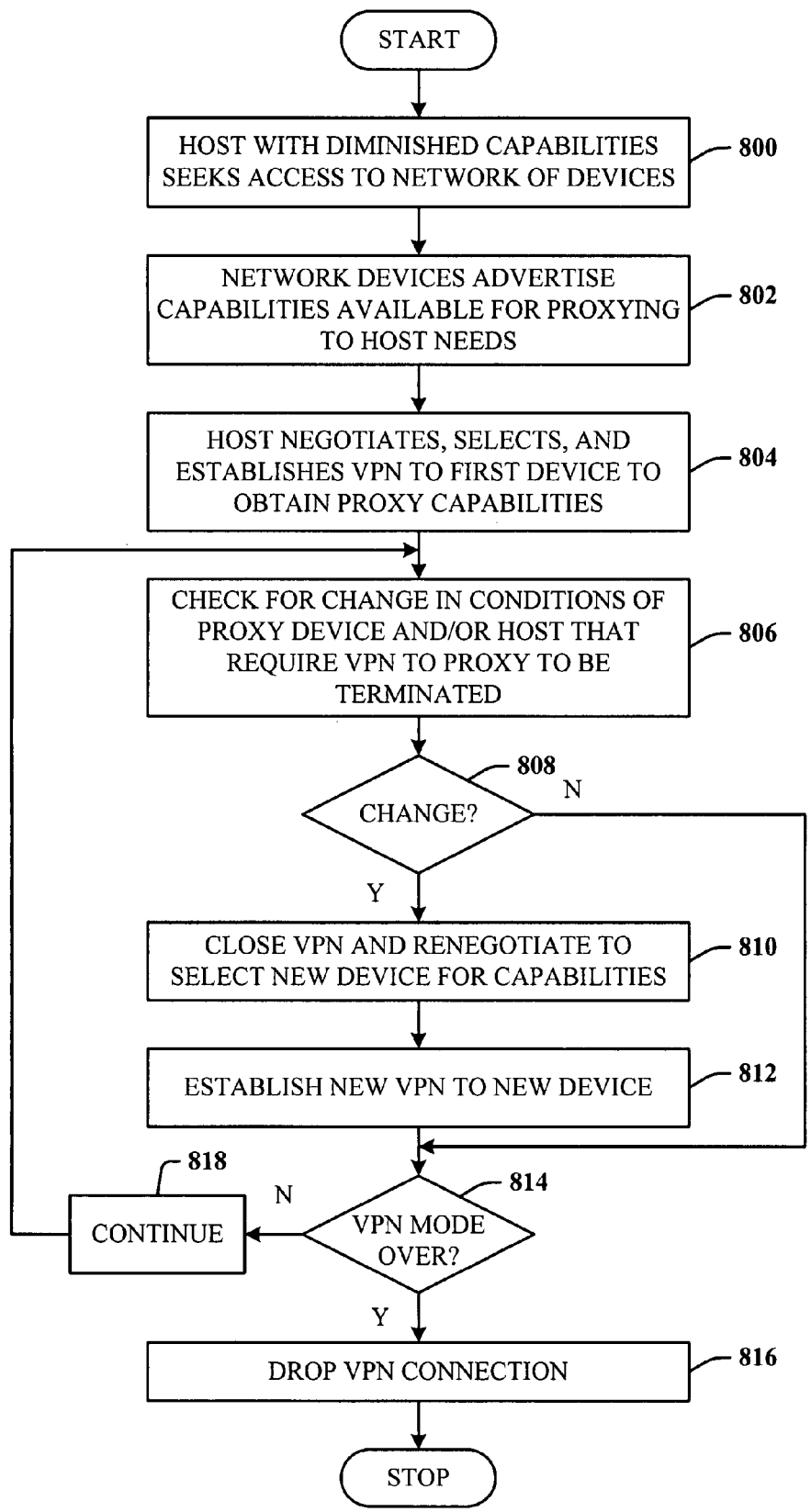
FIG. 8 illustrates a method of negotiating for a new proxy device based on changing conditions.

FIG. 8 illustrates a method of negotiating for a new proxy device based on changing conditions. At 800, a host with diminished capabilities (e.g., limited or no malware protection, reduced hardware/software capabilities, etc.) seeks access to a network of devices. At 802, the network devices advertise capabilities available for proxying to host needs. At 804, the host negotiates, selects, and establishes VPN to first device to obtain proxy capabilities. At 806, a check is made for a change in conditions of the proxy device and/or the host that require the VPN to the proxy device to be terminated. In other words, a changed condition can be that the connection to the first proxy device failed, or the host device obtained the capability currently being provided by the first proxy device, or the capability currently being provided by the first device is of lesser quality or capability than another device of the network. At 808, if a change has occurred, flow is to 810 to close the existing VPN connection and renegotiate to select a new device for capabilities. At 812, based on the selection, a new VPN connection is established to the new device. At 814, if the purpose of the VPN mode is over, flow is to 816 to drop the VPN connection. If, at 814, the purpose is not over, flow is to 818 to continue the VPN connection, and then to 806 to continue checking for changing conditions. Additionally, at 808, if no changing condition is detected, flow is to 814.

Figure 9:
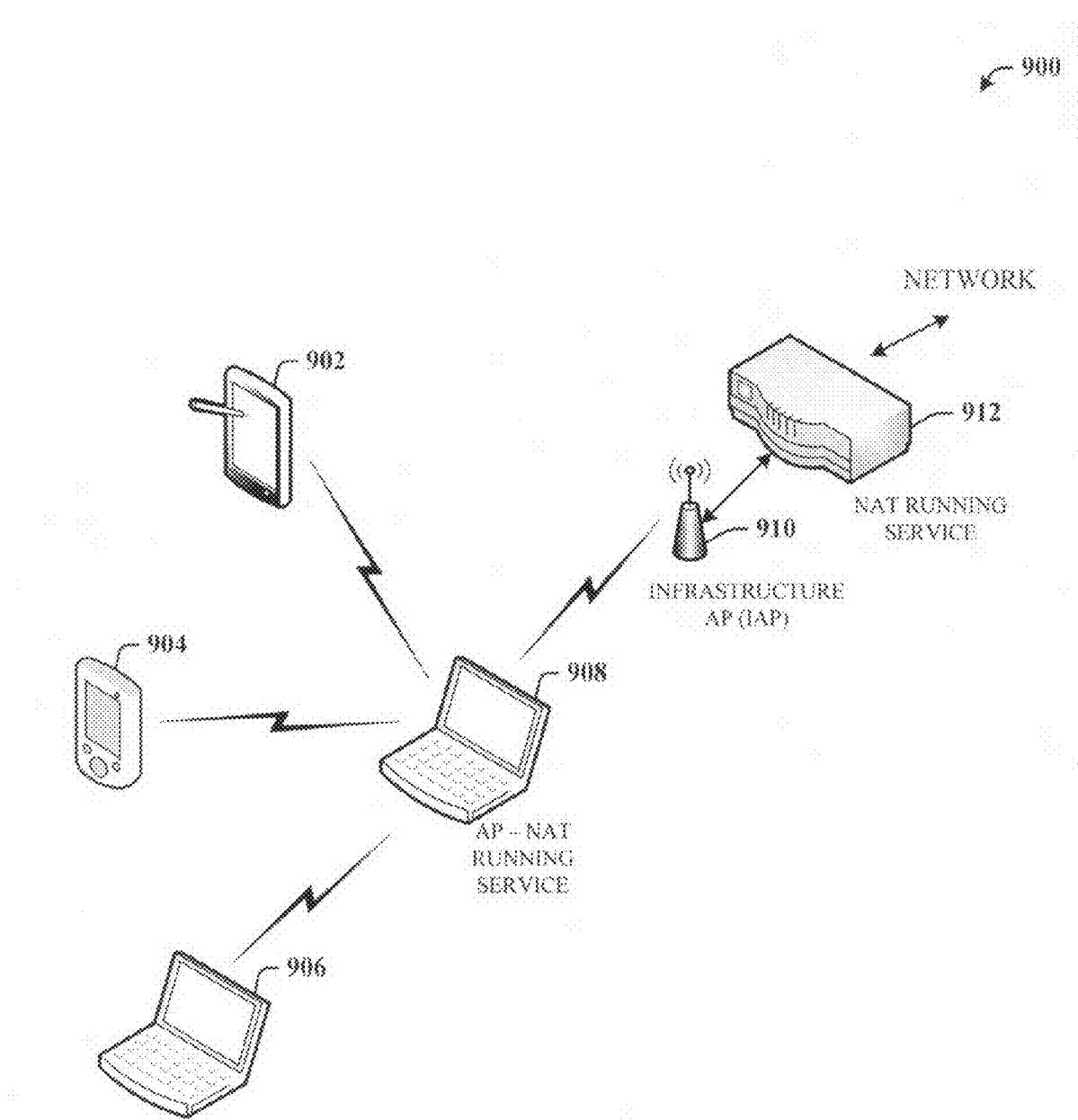
FIG. 9 illustrates a system that supports client roaming and the election of one of the clients as a proxy.

Following is a description of one or more implementations where clients are roaming, and a mechanism is provided for discovering and electing a client to act as a server for the protection of one or more other clients. Accordingly, FIG. 9 illustrates a system 900 that supports client roaming and the election of one of the clients as a proxy.

Consider an example where a group of four employees (and associated machines 902, 904, 906 and 908) are attending a security conference. As per a conference policy, for example, it is required that certain protective shields be in place on the attendee computers or similar devices (902, 904, 906 and 908) before the machines or devices (902, 904, 906 and 908) are allowed to be brought online to the conference network (denoted NETWORK). It should be understood that the machines or devices (902, 904, 906 and 908) can be those that run an OS and/or variations of that OS (e.g., a desktop versus a PDA versus a smartphone). Conventionally, the employee machines or devices that were not equipped with the proper security software would be vulnerable to attacks after connecting to the NETWORK, especially from known published exploits.

Utilizing the disclosed architecture, only one protected machine 908 of the group of employee machines (902, 904, 906 and 908) needs to be equipped with the proper security software for providing protection against known exploits for the other machines (902, 904 and 906). Accordingly, the other unprotected machines (902, 904 and 906) can redirect machine traffic through the protected machine 908 to mount an effective protective shield against attacks defended by that service.

The leveraging of the one machine 908 of a group of friendly machines (e.g., a peer arrangement) to mount an effective security shield for the other machines or devices will now be addressed.

Machines (902, 904, 906 and 908) that are equipped with one or more components of the disclosed architecture can advertise an ad-hoc network when outside of a managed network such as an enterprise network. The network type can be determined by a network location service in a client OS, for example. One way of determining the network type is to query a user whenever a new wireless network is detected, or alternatively, to attach to the new network, and then check for the presence of an enterprise-only server such as a domain controller. Alternatively, or in combination therewith, authentication can be made to the domain controller if the machine is a member of a domain hosted by the enterprise.

A machine (e.g., machine 908) can advertise an ad-hoc network named "dynamically shield", for example, while attached to an infrastructure access point (IAP) 910, if the machine 908 supports both infrastructure and ad-hoc modes concurrently (this can be a single radio or multiple radios). This can be connected to the AP (or base station) of the Internet service provider (ISP) on a WLAN or WWAN that connects the client machine 908 to the larger network (NETWORK), such as the Internet. A machine (e.g., machine 908) that does not support concurrent mode can disconnect from the infrastructure AP 910 to which it is connected, to advertise the ad-hoc network, and obtain the benefits through another machine that does support concurrent mode. Even if the machine 908 supports concurrent mode, a conservative security policy may require immediate disconnect from the infrastructure AP 910 of a potential risky network such as in a public hotspot (e.g., of a coffee shop) if some particular protective shield is missing.

A machine (902, 904 or 906) that needs to use the services of a proxy (machine 908) to acquire a security shield can form an ad-hoc network (e.g., with IEEE 802.1x security) with the other machines advertising the "dynamically shield" network. The machines (902, 904 and 906) on the shielded network can exchange security and other resource capabilities information over the ad-hoc network. Resource capabilities information can include the following: OS running on the machine; active security software available on the machine; CPU, memory, other hardware resource information; whether the machine can act as a relay AP with network address translation (NAT) capability (e.g., machine 908); and the willingness to become a proxy. A relay AP acts as an AP for clients, while connecting to an infrastructure AP 910 as a client machine. The relay AP relays received client traffic to the infrastructure AP 910.

Once the machine resource capabilities are assessed, at least one machine (e.g., machine 908) can be elected to be the proxy server. After a machine seeking protective services (a "seeking" machine) receives the capabilities information of the various other machines of the network, the seeking machine checks the capabilities information to determine which other machines qualify as a proxy. In case only one machine qualifies such as machine 908 in this example, the single machine 908 is elected as the proxy server. In case more than one of the machines qualify, the seeking machine can use and process criteria to elect one of the other machines as the proxy. The criteria can include the consideration of factors such as the IP address of the potential proxy machine, the amount of memory or CPU available on the potential machine, or other identity or physical attributes. The criteria used can be specified by the seeking machine's security policy.

After the proxy 908 is elected, the seeking machine(s) informs the elected proxy machine of the same so that the elected proxy 908 can enter a relay AP-NAT mode. In the relay AP-NAT mode, the elected proxy 908 can provide DHCP and NAT services to the client machines. This DHCP-NAT functionality can be found in more widespread OS's. The elected proxy 908 relays non-DHCP IP network traffic onto the infrastructure AP 910, which sends the IP traffic over the larger network (NETWORK) after passing the IP traffic through the proxy security shield service(s).

Once the proxy 908 is elected and informed of service as the proxy, the seeking machines (902, 904 and 906) disconnect from the ad-hoc dynamically shielded network and connect to the proxy 908 in infrastructure wireless mode. As indicated previously, a machine supporting concurrent mode can be connected concurrently both to the infrastructure AP 910 as well as the relay AP. The seeking machines (902, 904 and 906) send the DHCP discover on the wireless link to the proxy 908 and, the proxy machine 908 acts as a DHCP server and issues a private address to each of the seeking client machines (902, 904 and 906).

The seeking client machines (902, 904 and 906) deprecate the addresses received while directly connected through the infrastructure AP 910 prior to connecting to that network through the 908 proxy. No new traffic is sent or received on these deprecated addresses. The seeking clients (902, 904 and 906) can choose to delete these addresses, through the DHCP release message, once the number of active connections formed decreases to zero, as was described supra. Finally, the seeking client machines (902, 904 and 906) send and receive traffic through the proxy 908.

Note that the elected client machine 908 may not be able to act as a server that accepts unsolicited connections for one of the protected machines because the addresses are NATed. This potential problem can be resolved by having the elected machine 908 become a Winsock proxy and the seeking clients (902, 904 and 906), as Winsock proxy clients.

Figure 10:
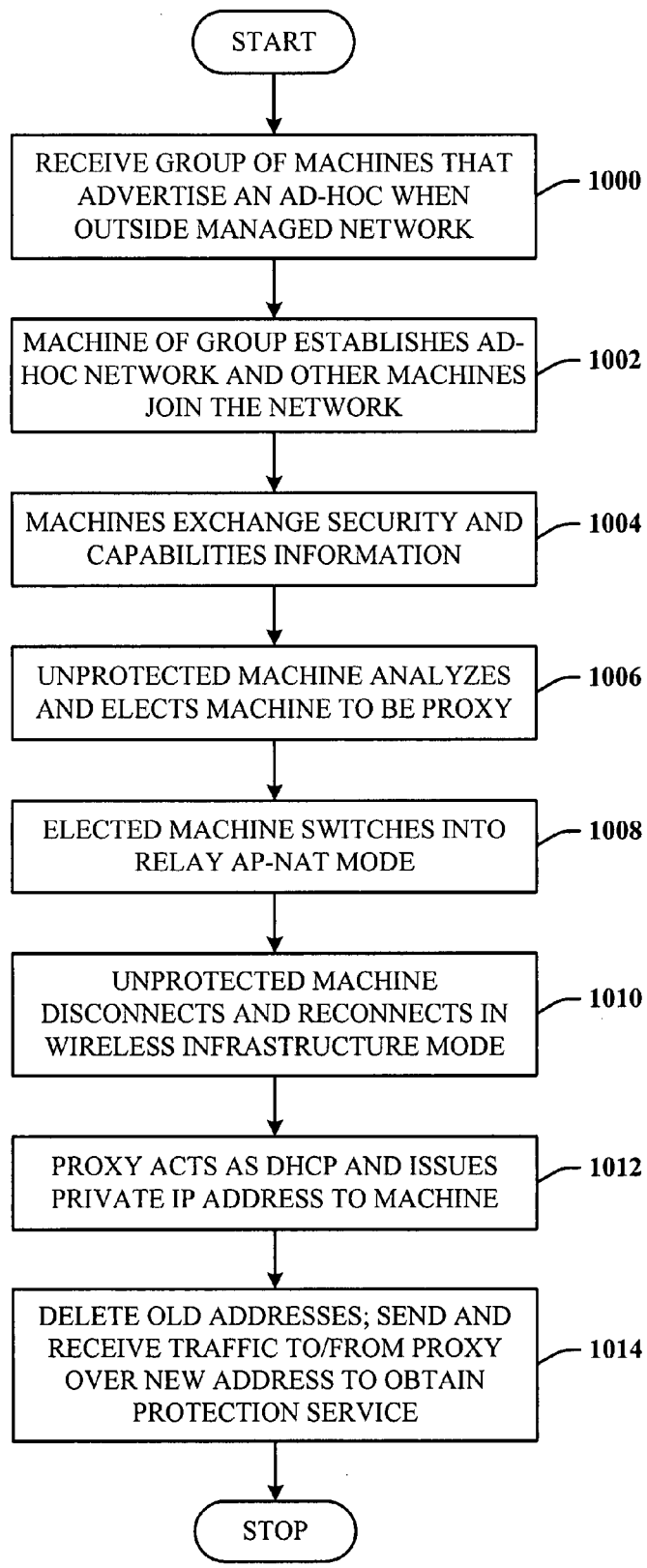
FIG. 10 illustrates a method of ad-hoc network protection service processing in accordance with an innovative aspect of the disclosed architecture.

FIG. 10 illustrates a method of ad-hoc network protection service processing in accordance with an innovative aspect of the disclosed architecture. At 1000, a group of machines is received that advertises an ad-hoc network when outside a managed network. At 1002, a machine of the group establishes an ad-hoc network. Other machines join the network. At 1004, the machines of the network exchange security and capabilities information. At 1006, an unprotected machine analyzes the capabilities and security information and elects one of the machines to be proxy. At 1008, the elected machine switches into relay AP-NAT mode. At 1010, the unprotected machine disconnects from the ad-hoc network and reconnects in wireless infrastructure mode. At 1012, the proxy acts as a DHCP server and issues a private IP address to the unprotected machine. At 1014, old addresses are deleted, and machine traffic is sent and received to/from over the new IP address connection to obtain the protection services.

Figure 11:
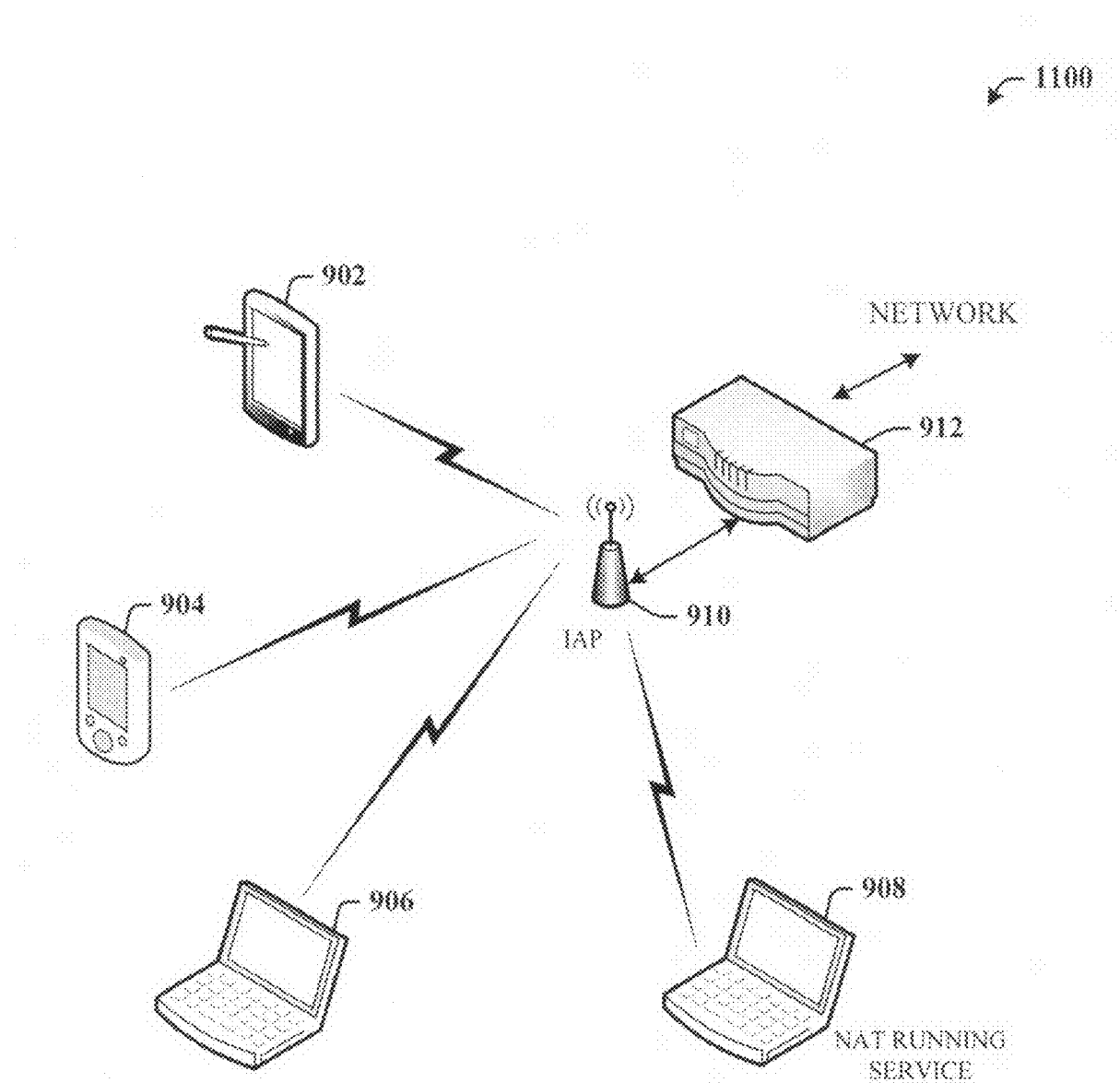
FIG. 11 illustrates an alternative implementation of a system where a group of machines connects to a same hotspot infrastructure via an Infrastructure Access Point (IAP) and obtains protection services hosted on a NAT device.

FIG. 11 illustrates an alternative implementation of a system 1100 where the group of machines (902, 904, 906 and 908) connects to a same hotspot infrastructure via the IAP 910 of the hotspot network, and obtains protection services hosted on machine 908, which is also running the NAT service in this case. The machines (902, 904, 906 and 908) connect via the IAP 1102, advertise ad-hoc network and, exchange security and capabilities information. One or more of the machines seeking protection services elects one of the machines as the proxy. In this implementation, the elected machine 908 acts as a DHCP/NAT with security shields without also becoming an AP.

When the unprotected machine that was using the elected machine as the proxy wants to revert back to direct communication, as it would when the right patch or security software is incorporated, the unprotected machine terminates the infrastructure connection to the proxy, if a relay AP/NAT, and connects directly to infrastructure AP. The unprotected machine renews the old non-expired addresses, if the addresses had been acquired prior to connecting to the elected proxy and had not deleted the old addresses earlier, or acquires new addresses.

Figure 12:
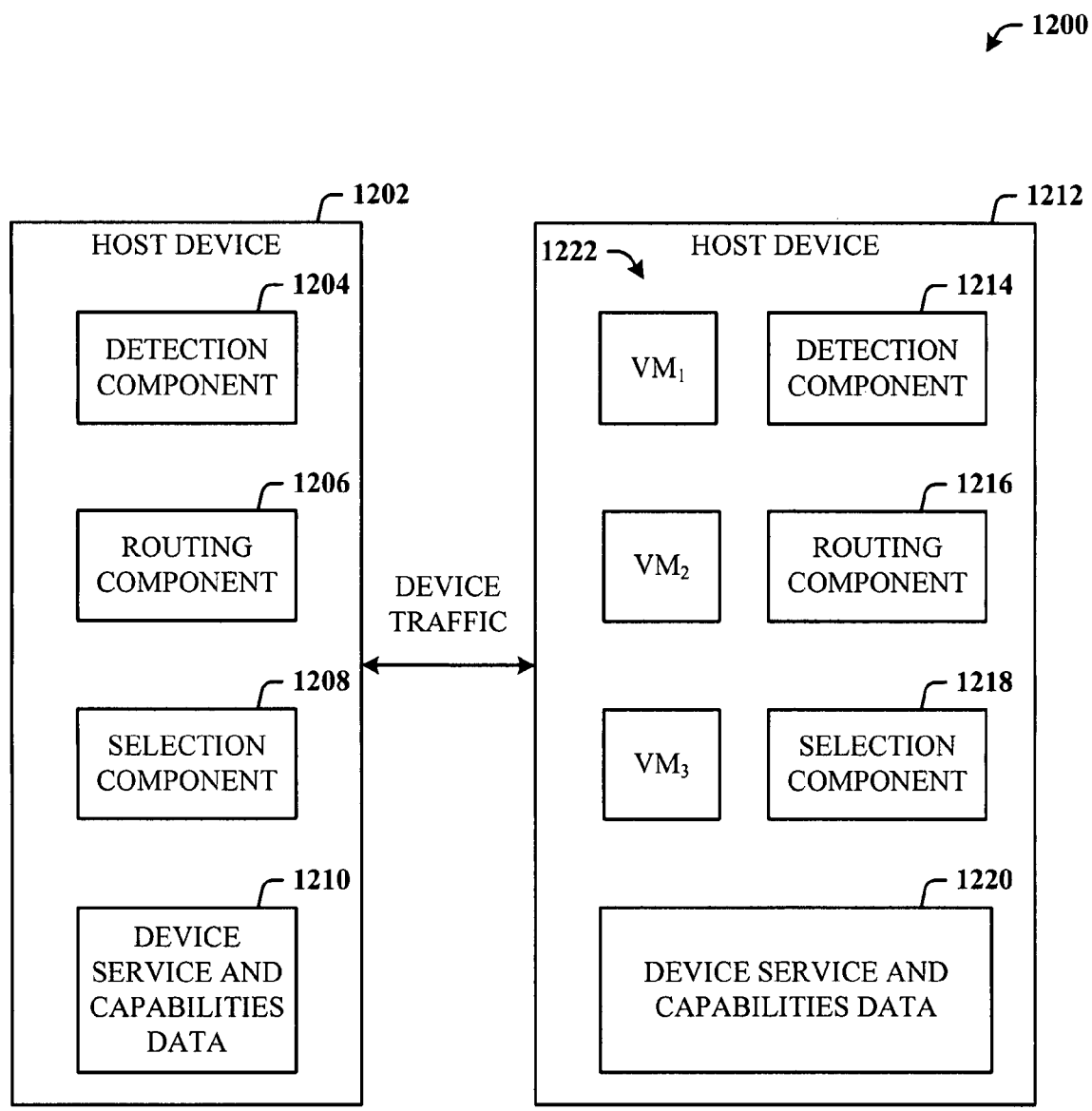
FIG. 12 illustrates an alternative system that employs one or more virtual machines (VMs) as a viable proxy candidates and/or unprotected machines.

FIG. 12 illustrates an alternative system 1200 that employs one or more virtual machines (VMs) as a viable proxy candidates and/or unprotected machines. Here, a first host device (or machine) 1202 includes a detection component 1204, routing component 1206, selection component 1208 and, device service and capabilities information 1210. The components 1204, 1206 and 1208 are similar to the respective components 102, 104 and 202.

A second host device 1212 includes a detection component 1214, routing component 1216, selection component 1218, which are similar to the respective components 102, 104 and 202, and device service and capabilities data 1220. Additionally, the second host device 1212 includes a set of three VMs 1222 (denoted $VM_1$, $VM_2$ and $VM_3$). The device service and capabilities data 1220 includes information about the VMs 1222 such that this information can be made available to other machines seeking security services and/or device capabilities information for an ad-hoc network.

In accordance with VM operation, for example, the first host device 1202 can elect one of the three VMs 1222 to act as the proxy. Moreover, two of the VMs 1222 can receive protection services from the elected VM. Similarly, the three VMs 1222 can obtain protection services from the first host device 1202, should this device 1202 be elected as the proxy. In an alternate embodiment, each of the VMs 1222 can have its own detection component 1214, routing component 1216, selection component 1218, and the device service and capabilities data 1220. Operations described above with respect to old and new addressing still apply, as well as traffic routing and redirection, for example. Each VM can be considered as a remote component, device, or machine relative to another VM. Similarly, each VM can be considered as a remote component, device, or machine relative to the first host device 1202.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 13:
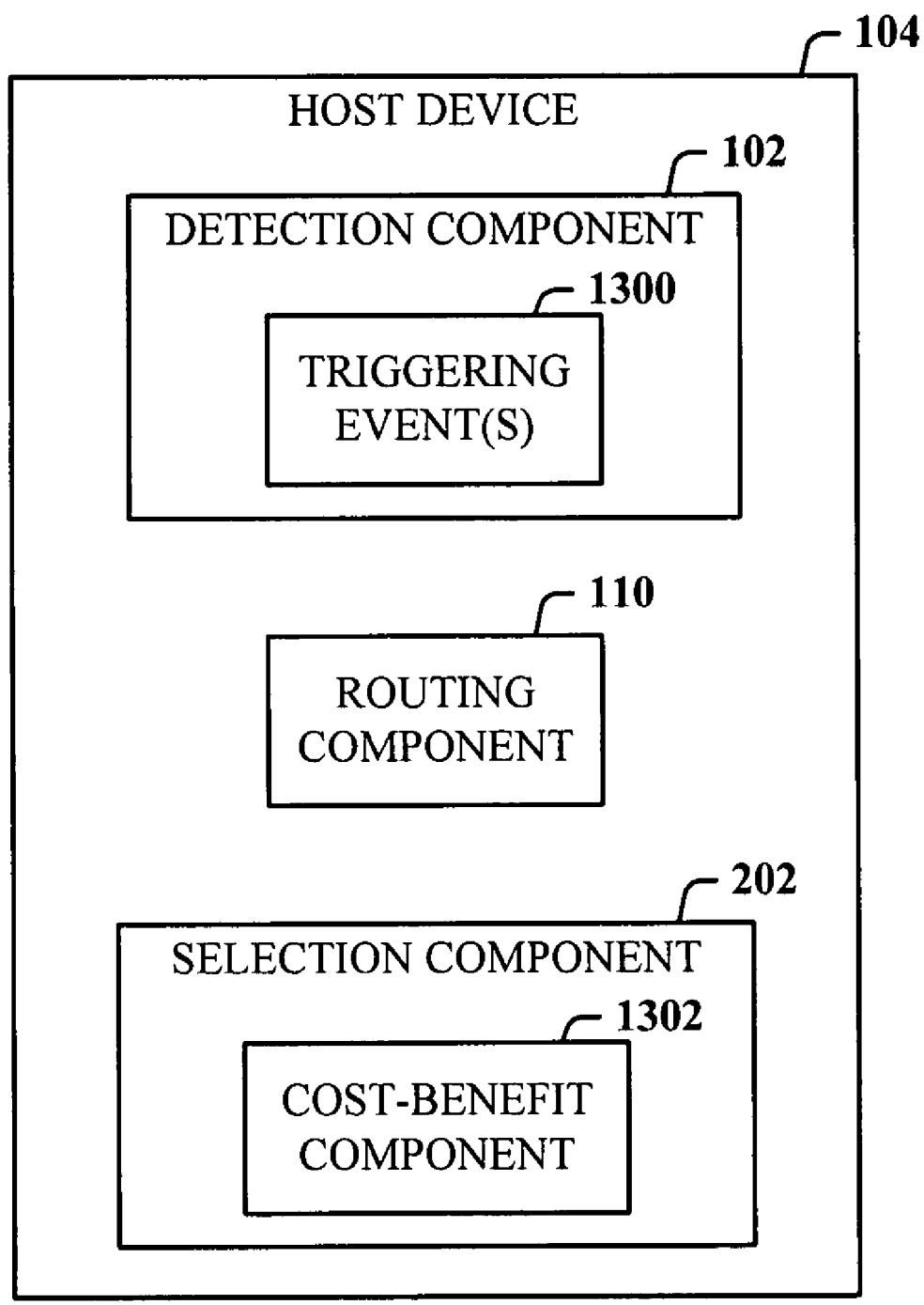
FIG. 13 illustrates a more detailed diagram of the host device of FIG. 1.

FIG. 13 illustrates a more detailed diagram of the host device 104 of FIG. 1. Here, the detection component 102 is shown with one or more triggering events 1300 that trigger the seeking of protection services by the client 104. For example, a risk beacon can be broadcast that is received as the triggering event 1300. Alternatively, or in combination therewith, based on self-awareness of system capabilities, such as a software protection stack related to a particular threat, the host device 104 can auto-initiate triggering of the processes to seek protection services. In addition to the routing component 110, the device 104 includes the selection component 202, which can further include a cost-benefit analysis component 1302 for performing cost-benefit analysis for various operations. For example, cost-benefit analysis can be performed related to which remote device to select and elect, whether to delete old addresses, which mode to activate, and so on.

In yet another implementation, the cost-benefit component 1302 can be employed to determine which remote system to select based on network access, existing loading of processes running on a potential machine for election as a proxy, how far away the candidate proxy machine is, etc. If the risk is high to use an initially-favored candidate for proxy, cost-benefit analysis can signal re-selection and election of a different remote machine, for example. These are just a few examples for which cost-benefit analysis can be employed to enhance the architecture.

Figure 14:
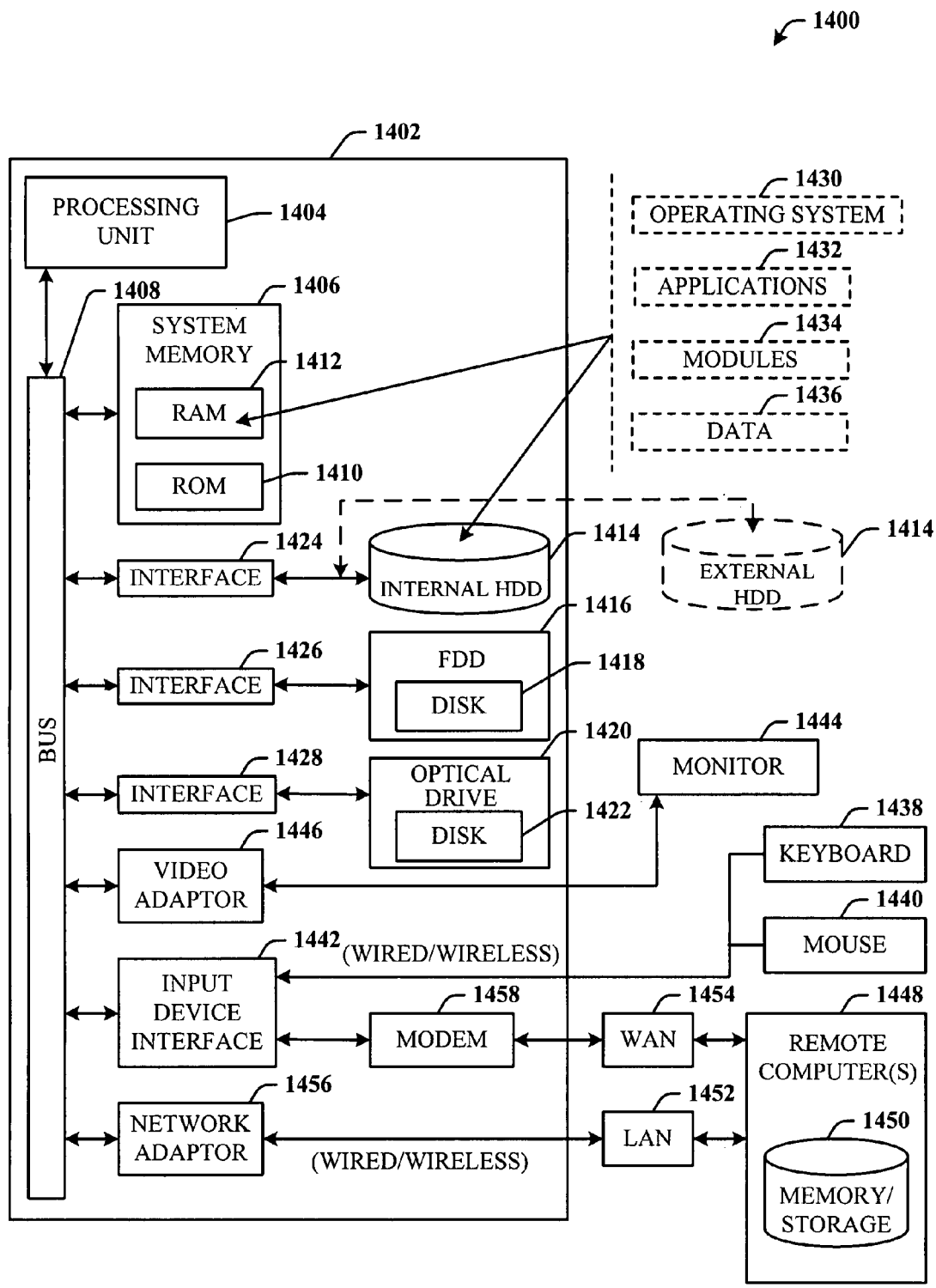
FIG. 14 illustrates a block diagram of a computing system operable to execute component functionality described herein in accordance with the disclosed architecture.

Referring now to FIG. 14, there is illustrated a block diagram of a computing system 1400 operable to execute component functionality described herein in accordance with the disclosed architecture. In order to provide additional context for various aspects thereof, FIG. 14 and the following discussion are intended to provide a brief, general description of a suitable computing system 1460 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 14, the exemplary computing system 1400 for implementing various aspects includes a computer 1402, the computer 1402 including a processing unit 1404, a system memory 1406 and a system bus 1408. The system bus 1408 provides an interface for system components including, but not limited to, the system memory 1406 to the processing unit 1404. The processing unit 1404 can be any of various commercially available processors. Dual microprocessors and other multi-processor architectures may also be employed as the processing unit 1404.

The system bus 1408 can be any of several types of bus structure that may further interconnect to a memory bus (with or without a memory controller), a peripheral bus, and a local bus using any of a variety of commercially available bus architectures. The system memory 1406 includes read-only memory (ROM) 1410 and random access memory (RAM) 1412. A basic input/output system (BIOS) is stored in a non-volatile memory 1410 such as ROM, EPROM, EEPROM, which BIOS contains the basic routines that help to transfer information between elements within the computer 1402, such as during start-up. The RAM 1412 can also include a high-speed RAM such as static RAM for caching data.

The computer 1402 further includes an internal hard disk drive (HDD) 1414 (e.g., EIDE, SATA), which internal hard disk drive 1414 may also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1402, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. It is to be appreciated that the disclosed architecture can be implemented with various commercially available operating systems or combinations of operating systems.

The system 1402 can be the host device 104, where the programs 1432 and/or other modules 1434 include the detection component 102, routing component 110, selection component 202, device service and capabilities data (1210 and 1220), virtual machines 1222, trigger events 1300 and cost-benefit component 1302, for example. In the case of virtual machines 1222, the operating system 1430 can be duplicated for each virtual machine 1222 but running on different images for isolation purposes. Additionally, selected subsystems and components of system 1402 can be utilized in a various combinations to provide similar capabilities as the devices 306, 308 and 310 of FIG. 3, and devices 902, 904, 906, 908 and 912 of FIG. 9, for example.

A user can enter commands and information into the computer 1402 through one or more wire/wireless input devices, for example, a keyboard 1438 and a pointing device, such as a mouse 1440. Other input devices (not shown) may include a microphone, an IR remote control, a joystick, a game pad, a stylus pen, touch screen, or the like. These and other input devices are often connected to the processing unit 1404 through an input device interface 1442 that is coupled to the system bus 1408, but can be connected by other interfaces, such as a parallel port, an IEEE 1394 serial port, a game port, a USB port, an IR interface, etc.

A monitor 1444 or other type of display device is also connected to the system bus 1408 via an interface, such as a video adapter 1446. In addition to the monitor 1444, a computer typically includes other peripheral output devices (not shown), such as speakers, printers, etc.

The computer 1402 may operate in a networked environment using logical connections via wire and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wire/wireless connectivity to a local area network (LAN) 1452 and/or larger networks, for example, a wide area network (WAN) 1454. Such LAN and WAN networking environments are commonplace in offices and companies, and facilitate enterprise-wide computer networks, such as intranets, all of which may connect to a global communications network, for example, the Internet.

When used in a LAN networking environment, the computer 1402 is connected to the local network 1452 through a wire and/or wireless communication network interface or adapter 1456. The adaptor 1456 may facilitate wire or wireless communication to the LAN 1452, which may also include a wireless access point disposed thereon for communicating with the wireless adaptor 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wire and/or wireless device, is connected to the system bus 1408 via the serial port interface 1442. In a networked environment, program modules depicted relative to the computer 1402, or portions thereof, can be stored in the remote memory/storage device 1450. It will be appreciated that the network connections shown are exemplary and other means of establishing a communications link between the computers can be used.

The computer 1402 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, for example, computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3 or Ethernet).

Figure 15:
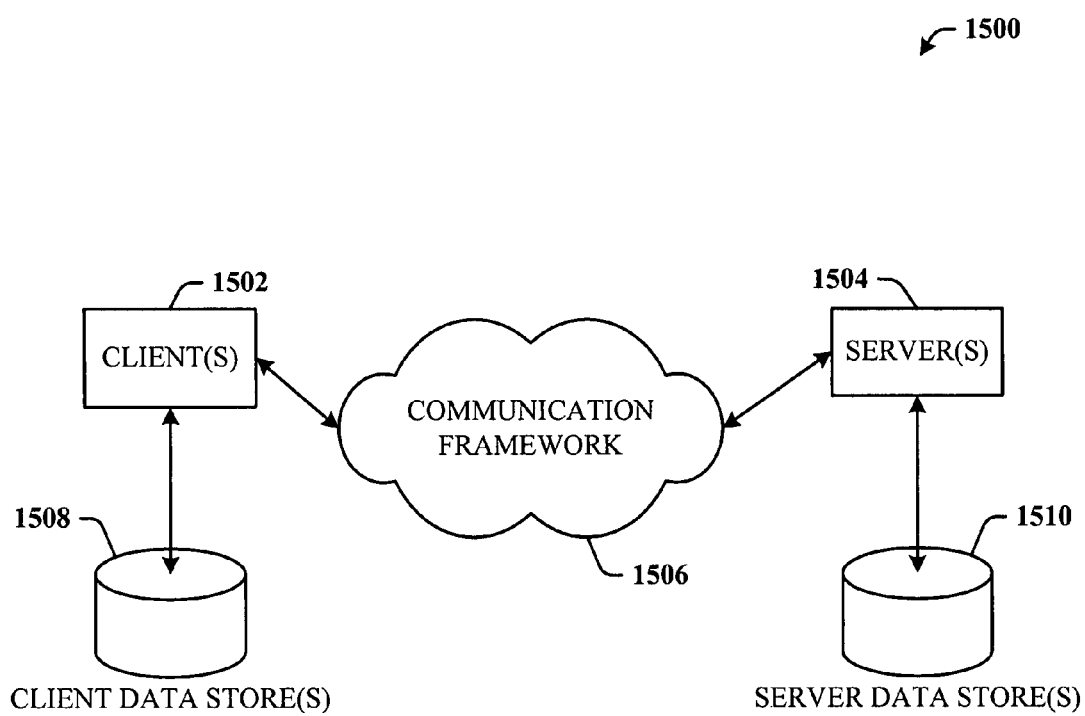
FIG. 15 illustrates a schematic block diagram of an exemplary computing environment for client/proxy protection described herein.

Referring now to FIG. 15, there is illustrated a schematic block diagram of an exemplary computing environment 1500 for client/proxy protection described herein. The system 1500 includes one or more client(s) 1502. The client(s) 1502 can be hardware and/or software (e.g., threads, processes, computing devices). The client(s) 1502 can house cookie(s) and/or associated contextual information, for example.

The system 1500 also includes one or more server(s) 1504. The server(s) 1504 can also be hardware and/or software (e.g., threads, processes, computing devices). The servers 1504 can house threads to perform transformations by employing the architecture, for example. One possible communication between a client 1502 and a server 1504 can be in the form of a data packet adapted to be transmitted between two or more computer processes. The data packet may include a cookie and/or associated contextual information, for example. The system 1500 includes a communication framework 1506 (e.g., a global communication network such as the Internet) that can be employed to facilitate communications between the client(s) 1502 and the server(s) 1504.

Communications can be facilitated via a wire (including optical fiber) and/or wireless technology. The client(s) 1502 are operatively connected to one or more client data store(s) 1508 that can be employed to store information local to the client(s) 1502 (e.g., cookie(s) and/or associated contextual information). Similarly, the server(s) 1504 are operatively connected to one or more server data store(s) 1510 that can be employed to store information local to the servers 1504.

The clients 1502 can include the host devices 104, remote systems 204, devices 304, 306, 308, 310, 312, 314, 316 and 318, of FIG. 3, devices 902, 904, 906 and 908 of FIG. 9, and host devices 1202 and 1212 of FIG. 12, for example. The servers 1504 can include the selected and elected client which then acts as a proxy server for protection services, and the VPN server 302 of FIG. 3, for example.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented services system, comprising:
    a detection component of a host device for detecting a risk beacon indicative of a risk of intrusion;
    a remote component for providing an intrusion protection service to the host device;
    a redirection component for dynamically redirecting host traffic to the remote component to obtain the intrusion protection service until intrusion protection software is installed on the host device, thereafter the host device disconnects from the remote component; and
    a processor operable to execute computer-executable instructions associated with at least one of the detection component, the remote component, or the redirection component.

2. The system of claim 1, wherein the remote component is a fixed security proxy server.

3. The system of claim 1, wherein the remote component is a remote device that hosts the service and the remote device is elected and configured to act as proxy server to provide the service for the host traffic.

4. The system of claim 1, wherein the redirection component generates a virtual private network (VPN) connection to the remote component to obtain the service.

5. The system of claim 1, wherein the need detected by the detection component is further associated with receipt of at least one of pulled or pushed configuration information, or an auto-generated trigger based on machine-awareness of a lack of software associated with the service.

6. The system of claim 1, wherein the risk is associated with at least one of a firewall service, an intrusion protection service, or an anti-malware service.

7. The system of claim 1, further comprising a selection component for selecting which system of a plurality of remote systems to route the host traffic.

8. The system of claim 1, wherein the redirection component routes the host traffic directly to the host device without routing the traffic through the remote component.

9. The system of claim 1, wherein the host device initiates indirect communications of the host traffic by forming a VPN to the remote component via which the host traffic is routed to and from the remote component by the routing component.

10. The system of claim 1, wherein the host device reverts back to direct communications of the host traffic by re-registering a non-VPN address or acquiring a new address.

11. The system of claim 1, wherein the remote component is a wireless device elected to serve as a proxy for the service based on at least one of device service data or capabilities data.

12. A computer-implemented method of providing services, comprising acts of:
   receiving a risk beacon at a client associated with a need for a protection service;
   detecting available remote resources of a wireless network for the service;
   selecting a first resource of the available remote resources;
   redirecting client traffic to the first resource over the wireless network;
   processing the client traffic through the service to protect the client;
   disconnecting the client from the first resource when the protection service is no longer needed; and
   utilizing a processor to execute instructions stored in memory to perform at least one of the acts of receiving, detecting, selecting, redirecting, processing, or disconnecting.

13. The method of claim 12, further comprising dynamically performing at least one of the acts of detecting, selecting, or redirecting.

14. The method of claim 12, further comprising initiating communications to the first resource by acts of:
   forming a VPN between the client and the first resource; and
   deprecating old non-VPN addresses on local network interfaces.

15. The method of claim 12, further comprising initiating communications to the first resource by acts of:
   deregistering non-VPN addresses from a domain name server (DNS); and
   deleting old non-VPN, non-static, addresses when the non-VPN addresses become inactive.

16. The method of claim 12, further comprising reverting back to direct communications by one or more acts of:
   re-registering an unexpired non-VPN address in a DNS or acquiring a new non-VPN address;
   deprecating the acquired new VPN address to prevent a new connection from being formed on the first resource, which is a VPN server; and
   terminating the VPN when no new connection is active over the VPN.

17. The method of claim 12, wherein the client is one of a plurality of wireless clients, which one or more of the plurality of wireless clients is detected as the remote resources based on advertisement of an ad-hoc network by the one or more of the plurality of wireless clients.

18. The method of claim 12, wherein the first resource disconnects from the wireless network, which is an ad-hoc network, and reconnects as an access point-network address translation device.

19. The method of claim 18, wherein the client deprecates and deletes an address used for direct communications.

20. A computer-implemented system, comprising:
   a host component operating without intrusion protection software;
   a detection component of the host component for detecting a risk beacon associated with a risk of an intrusion threat;
   a proxy component, operating with intrusion protection software, for redirecting traffic to the host component, thereby providing intrusion protection to the host component until protection provided by the proxy component is no longer needed, thereafter the host component disconnects from the proxy component; and
   a processor operable to execute computer-executable instructions associated with at least one of the host component, the detection component, or the proxy component.

* * * * *